Patented Sept. 28, 1937

2,094,452

UNITED STATES PATENT OFFICE 2,094,452

COLORED MINERAL GRANULES

Carl E. Hillers, Charlottesville, Va., assignor to Blue Ridge Slate Corporation, Charlottesville, Va., a corporation of Virginia No Drawing. Application August 20, 1935, Serial No. 36,985

15 Claims. (Cl. 91—70)

This invention relates to the color coating of granular mineral material. The product finds use as a decorative surfacing for asphalt shingles and other building materials. The product may also be used for other ornamental and amusement purposes.

A number of methods have been employed in the past for color coating granular mineral material, but the processes in general fall into two general classes, depending upon the temperature employed during the setting of the coating on the granules. By "setting" is meant the stages, processes, steps or operations following the mixing of the coating ingredients or materials over the surfaces of the granular mineral material, whereby the colored coating is anchored to the granule base in a weather-resistant form. This setting may be merely chemical reaction between the coating ingredients at relatively low temperatures, or chemical reaction between the coating ingredients and the granular base, or chemical or physical change at high temperatures, or purely fusion at high temperatures, etc.

Few of the proposed methods of color coating granular bases, in which the coating ingredients have been set at relatively low temperatures (below 400° F., for example), have been successful commercially, at least when such products were used for surfacing prepared roofing. As a result, roofing manufacturers have been placing greater reliance upon color coated granules evolved by high temperature processes (from 1500–2000° F., for example). Color coated granules thus produced, however, are generally glassy surfaced, and adhere to asphalt shingles poorly.

According to the present invention colored granules may be produced at temperatures of 1500°–2000° F. which will adhere to the asphalt coating layer of shingles better than the glaze coated granules formerly produced. By my process, rough surface color coated granules are produced which possess the weather resistance usually associated with glaze coated granules made at similar temperatures, but with better adherence to the asphalt coatings of shingles.

My process depends upon the fact that certain compounds of aluminum are partially dissolved by or react chemically with a fused or partly fused coating of sodium silicate, and the first product of such solution or reaction is a sodium-aluminum silicate or a combination or mixture of aluminum oxide and sodium silicate which fuses at a higher temperature than sodium silicate. Therefore, the fused sodium silicate is rendered infusible in a roughened form. It must, of course, be understood that if the temperature should be raised considerably higher, the entire coating will again become fused, and the product will possess a glassy surface, which is to be avoided. By proper temperature control, however, in conjunction with controlled amounts of aluminum compounds, the character of the surface coating may be controlled.

By the expression "controlled amounts of aluminum compounds" I mean, as is observed in practice, that increasing the amount of the aluminum compound usually raises the temperature at which the above mentioned refusion will occur. It is unnecessary to employ amounts of aluminum compounds in excess of those needed to produce the infusibility desired, but somewhat larger amounts prolong the range of infusibility and, within moderation, this is not objectionable.

The following example will serve to illustrate one method I employ to produce rough surfaced color-coated granules by my process. For granular mineral matter, I shall here use light colored gravel reduced by crushing and screening to pass 10 mesh but to be retained on 30 mesh, which material I shall, for the purposes of this example, call "granules".

To one ton of granules, add 100 lbs. of sodium silicate of specific gravity 1.42 (factor 1Na$_2$O to 3.25SiO$_2$) and mix for about two minutes, more or less. The mixing is preferably done in a so-called Stedman mixer consisting of an open top circular pan revolving on a perpendicular axis and having two diametrically opposite sets of revolving mixer blades, and a centrally located discharge opening. Then add 10–20 lbs. of chrome oxide (coloring agent to produce a green color), and continue mixing for another period of about 12 to 15 minutes. The period of this mixing may be shorter or longer than the length of time specified, and varies with the atmospheric temperature and humidity, as will be discussed later. It is essential in this example that the mixing be continued until the coating materials on the granules have lost their original wet, slippery condition and have passed into a drier, more cohesive condition. This change occurs through loss of water from the sodium silicate by evaporation, and may be considered to have proceeded sufficiently when a handful of the granules form a slightly cohesive ball when squeezed. However, for this example, it is safer to carry the evaporation somewhat beyond the point necessary rather than to evaporate insufficiently. Evaporation may be assisted mechanically by passing a current of warm air from a fan or a blower over the surface of the granules in the mixer, and if such means be efficient, the mixing time during this period may be considerably reduced below the 12 to 15 minutes mentioned. Under conditions unfavorable for evaporation of water, 45 minutes or longer might be necessary to bring the coated granules to the cohesive stage.

When the cohesive stage has been reached, about ten pounds of commercial ground aluminum sulfate, preferably screened to pass 100% through a 35 or 40 mesh screen, is added, and the mixing is continued for about one minute, possibly less, but preferably not much longer. Under the influence of the dry aluminum sulfate, the cohesiveness of the granules is destroyed, and separation largely into individual granules rather than lumps of clustered granules, occurs. Without unnecessary delay, the mass of separated granules is introduced into a heating device where they are heated to a temperature of about 1650°–1700° F. and then cooled, either naturally in piles, or in a cooling device.

During the steps outlined in the above example it is intended first to produce a wet coating of sodium silicate upon substantially all the surfaces of the granular particles, second, to distribute coloring material over the surfaces of the granular particles, although the order of the first and second steps may be reversed, as will be apparent to one skilled in the art; third, a partial drying out of the layer of sodium silicate and coloring material surrounding the individual granules due to thickening of the sodium silicate induced by evaporation of water, whereby the sodium silicate, being in very concentrated and nearly dry form, will be adhesive toward, but greatly reduced in reactivity toward aluminum sulfate; fourth, to distribute dry powdered aluminum sulfate over the surfaces of the coated granules; fifth, rapidly to dry the colored sodium silicate and its adhering aluminum sulfate by heating; sixth, to heat the coated granules to cause fusion of the sodium silicate; seventh, to heat the coated granules to cause chemical reaction with the aluminum sulfate or its heat product, aluminum oxide, and render the sodium silicate infusible; eighth, to stop the heating before the sodium silicate-aluminum oxide coating has been heated sufficiently higher to become fused of itself, thus producing, after cooling, non-lustrous colored coated granules; and ninth, to cool the granules.

To one skilled in the art, other variations of the above example will readily occur. For instance, the sodium silicate and the coloring matter might be first mixed into a paint, and this paint applied to the granules instead of applying the sodium silicate and coloring matter in two separate steps.

In the above example, it is essential that the sodium silicate coating (and color) should be in such condition through evaporation of water that its reactivity toward dry aluminum sulfate is very greatly reduced. Otherwise, the aluminum sulfate will coagulate the coating of colored sodium silicate, and cause the coating to be scraped off many of the surfaces of the granular particles during the mixing and tumbling; and this is most undesirable.

In the foregoing example, the colored product in commercial manufacturing may possess the property of leaching out sodium dichromate or sodium chromate when the cold granules are wet with water. This may be prevented by incorporating a reducing agent such as powdered graphite, powdered coal, etc., in the coating composition, or to some extent by proper regulation of the atmospheric condition during the heating operation. If a reducing agent, such as graphite, be employed, I prefer to add it with the sodium silicate, or with the coloring agent or with the aluminum sulfate, or in between these stages; and I have found that from 3 to 10 pounds is usually sufficient to produce green granules which do not leach out soluble chromium compounds.

While I have specified chromium oxide as the coloring compound in the above example, I do not wish to limit myself to that material, since other well-known coloring compounds may be used to produce other colors, and in various amounts to produce varying depths of shades in the colored coating.

In the foregoing example I have specified a Stedman mixer, but I do not wish to limit myself to that particular type of mixing device, since other devices can be adapted for use in my present process.

In the foregoing example, I have specified aluminum sulfate, and this is the preferred material. However, I find that similar results can be obtained with certain other aluminum compounds by suitable modifications, apparent to those skilled in the art, by the use of other aluminum salts and powdered heavy aluminum hydrate or powdered purified bauxite concentrate.

In the foregoing example I have used a definite sodium silicate. It is quite essential that the sodium silicate used in the present process should be concentrated rather than diluted with considerable water, otherwise more time will be consumed in concentrating the sodium silicate by evaporation prior to the addition of the aluminum sulfate. Sodium silicates of other factors may be used in place of the one specified without departing from the spirit of the present process.

For the heat treatment I prefer either an inclined rotary kiln or a rotary furnace.

In the example given, granules produced by crushing and screening light colored gravel were used, but other material such as quartz, flint, feldspar, sandstone, brick, glass, etc., may, after crushing and screening to suitable size, be used as a base. It is important that the base selected should be sufficiently refractory to withstand the heat treatment and that it shall be of such a nature as not to discolor the coating during the stages of the process.

The amounts of the materials prescribed in the example may be varied somewhat with certain granular bases, depending upon the surface area of the individual granule characteristic of the particular mineral base and the method of reducing the mineral to granule size, but the ratio of sodium silicate cannot usually vary more than twenty per cent. from the amount specified in the example, although slightly greater percentage variations might be possible without departing from the spirit of this invention.

Summarizing, the advantages of my present process lie in the coating produced, which is economical to color, and if prepared as here fully disclosed, does not bloom or blister on shingles, is substantially free from shine, gloss, etc., and has excellent adherence for the asphaltic coating on shingles.

In the following claims I shall use the term "aluminum compound" to include a salt or hydroxide or oxide of aluminum in dry powdered form.

What is claimed is:

1. The process of producing green-colored, non-glossy coatings on granules involving the following steps: first, applying sodium silicate, chrome oxide and graphite to granules and mixing; second, applying powdered aluminum sulfate and mixing; third, heating to a temperature of from 1600°–1900° F.; and fourth, cooling the granules.

2. The process of producing green-colored, non-glossy, non-blooming coatings on granules which involves the steps of adding per ton of granules, 100 lbs. of sodium silicate of specific gravity 1.40–1.42 and factor $Na_2O:3.25SiO_2$ and from ten to twenty pounds of chrome oxide and from 3 to 10 lbs. of powdered graphite and mixing until cohesive lumps form, then adding from 5 to 20 lbs. of powdered aluminum sulfate and continuing the mixing until the cohesive lumps separate into individual granules, then quickly heating the granules to a temperature of from 1600°–1900° F., and finally cooling the granules.

3. The process of producing green-colored, non-glossy coatings on granules involving the following steps: applying sodium silicate and chrome oxide and powdered coal to granules and mixing; applying powdered aluminum sulfate and mixing; heating to a temperature of from 1600°–1900° F.; and, finally, cooling the granules.

4. The process of producing green-colored, non-glossy, non-blooming coatings on granules which involves the steps of adding per ton of granules, 100 lbs. of sodium silicate of specific gravity 1.40–1.42 and factor $Na_2O:3.25SiO_2$ and from ten to twenty pounds of chrome oxide and from 3 to 10 lbs. of powdered coal and mixing until cohesive lumps form, then adding from 5 to 20 lbs. of powdered aluminum sulfate and continuing the mixing until the cohesive lumps separate into individual granules, then quickly heating the granules to a temperature of from 1600°–1900° F., and finally cooling the granules.

5. The process of producing colored non-glossy coatings on granules of mineral material, comprising the following steps: applying a colored wet coating of sodium silicate upon substantially all the surfaces of the granules; partially drying out the colored layer of sodium silicate surrounding the individual granules; distributing a dry powdered aluminum sulphate over the surfaces of the coated granules; rapidly drying the coated granules by heating; heating the coated granules to cause fusion of the sodium silicate and chemical reaction with the aluminum sulphate and its heat product; arresting the last-mentioned heating step before the coating becomes fused; and, finally, cooling the granules.

6. The process of producing colored, non-glossy coatings on granules of mineral material, comprising the following steps: applying a wet coating of sodium silicate upon substantially all the surfaces of the granules; uniformly distributing coloring material over the surfaces of the coated granules; partially drying out the layer of sodium silicate and coloring material surrounding the individual granules; distributing dry powdered aluminum sulphate over the surfaces of the coated granules; rapidly drying the colored sodium silicate and aluminum sulphate adhering thereto by heating; heating the coated granules to cause fusion of the sodium silicate, to cause chemical reaction with the aluminum sulphate and its heat product, aluminum oxide, and to render the sodium silicate infusible; arresting the last-mentioned heating step before the sodium silicate-aluminum oxide coating becomes fused; and, finally, cooling the granules.

7. As a new article of manufacture, mineral granules individually carrying on their surfaces a coating of the in situ formed heat product of, per ton of granules, from ten to twenty pounds of chrome oxide, from 3 to 10 lbs. of powdered graphite, from 5 to 20 lbs. of dry powdered aluminum sulfate and 100 lbs. of aqueous sodium silicate of specific gravity 1.40–1.42 and factor $Na_2O:3.25SiO_2$.

8. As a new article of manufacture, mineral granules individually carrying on their surfaces a coating of the in situ formed heat product, per ton of granules, of from ten to twenty pounds of chrome oxide, from 3 to 10 lbs. of powdered coal, from 5 to 20 lbs. of dry powdered aluminum sulfate, and 100 lbs. of aqueous sodium silicate of specific gravity 1.40–1.42 and factor $Na_2O:3.25SiO_2$.

9. The method of producing green colored, non-glossy, non-blooming coatings on granules which involves the steps of adding per ton of granules about 100 lbs. of sodium silicate of specific gravity 1.40–1.42 and factor $Na_2O:3.25SiO_2$ and from ten to twenty pounds of chrome oxide and from 3 to 10 pounds of finely divided reducing agent and mixing until cohesive lumps form, then adding from 5 to 20 lbs. of powdered aluminum sulfate and continuing the mixing until the cohesive lumps separate into individual granules, then quickly heating the granules to a temperature of from 1600°–1900° F., and finally cooling the granules.

10. As a new article of manufacture, refractory mineral roofing granules having a continuous coating of the in situ formed heat product of coloring agent, reducing agent, dry, powdered aluminum sulfate, and aqueous sodium silicate.

11. As a new article of manufacture, mineral granules individually carrying on their surfaces a coating of the in situ formed heat product of, per ton of granules, from ten to twenty pounds of coloring agent, from three to ten pounds of powdered reducing agent, from five to twenty pounds of dry powdered aluminum sulfate, and one hundred pounds of aqueous sodium silicate of specific gravity 1.40–1.42 and factor $Na_2O:3.25SiO_2$.

12. Roofing sheets comprising a roofing base surfaced with the product of claim 7.

13. Roofing sheets comprising a roofing base surfaced with the product of claim 10.

14. Roofing sheets comprising a roofing base surfaced with the product of claim 11.

15. The process of producing green-colored, non-glossy coatings on granules involving the following steps: first, applying sodium silicate, chrome oxide and a reducing agent to granules and mixing; second, applying powdered aluminum sulfate and mixing; third, heating to a temperature of from 1600°–1900° F.; and fourth, cooling the granules.

CARL E. HILLERS.